US010472802B2

(12) United States Patent
Ok et al.

(10) Patent No.: US 10,472,802 B2
(45) Date of Patent: Nov. 12, 2019

(54) LEAK PREVENTION APPARATUS FOR OPERATOR CABIN OF CONSTRUCTION EQUIPMENT

(71) Applicants: VOLVO CONSTRUCTION EQUIPMENT AB, Eskilstuna (SE); Sung Sam Ok, Gyeongsangnam-do (KR); Keun Hyuk Karl, Gyeongsangnam-do (KR)

(72) Inventors: Sung Sam Ok, Gyeongsangnam-do (KR); Keun Hyuk Karl, Gyeongsangnam-do (KR)

(73) Assignee: Volvo Construction Equipment AB, Eskilstuna (SE)

( * ) Notice: Subject to any disclaimer, the term of this patent is extended or adjusted under 35 U.S.C. 154(b) by 0 days.

(21) Appl. No.: 15/551,624

(22) PCT Filed: Mar. 4, 2015

(86) PCT No.: PCT/KR2015/002080
§ 371 (c)(1),
(2) Date: Aug. 17, 2017

(87) PCT Pub. No.: WO2016/140381
PCT Pub. Date: Sep. 9, 2016

(65) Prior Publication Data
US 2018/0038076 A1 Feb. 8, 2018

(51) Int. Cl.
*B60J 1/00* (2006.01)
*E02F 9/16* (2006.01)
*E02F 9/08* (2006.01)

(52) U.S. Cl.
CPC .............. *E02F 9/16* (2013.01); *B60J 1/006* (2013.01); *E02F 9/0891* (2013.01)

(58) Field of Classification Search
CPC .. E02F 9/16; E02F 9/0891; B60J 1/006; B60J 1/04
See application file for complete search history.

(56) References Cited

U.S. PATENT DOCUMENTS

2002/0078642 A1    6/2002 Yun

FOREIGN PATENT DOCUMENTS

JP          H06030252 U    4/1994
JP          2003041625 A   2/2003
(Continued)

OTHER PUBLICATIONS

International Search Report (dated Oct. 27, 2015) for corresponding International App. PCT/KR2015/002080.
(Continued)

*Primary Examiner* — Lori L Lyjak
(74) *Attorney, Agent, or Firm* — Sage Patent Group

(57) ABSTRACT

A leak prevention apparatus for an operator cabin of a construction equipment is provided which, in the case of the construction equipment being washed, or rainfall during the running of the construction equipment, can prevent water from leaking into the operator cabin includes a leakage prevention apparatus for an operator cabin of a construction equipment including a first plate which is fixed to the frame of an operator cabin of a construction equipment, a second plate which is connected to the first plate and diverges from the first plate in the opposite direction to a lower glass of the operator cabin, and a damper which is mounted on the second plate and is formed displaceably toward the lower glass of the cabin so as to control the pressure which presses the lower glass.

1 Claim, 4 Drawing Sheets

(56) References Cited

FOREIGN PATENT DOCUMENTS

| | | |
|---|---|---|
| JP | 2003237366 A | 8/2003 |
| JP | 2013181317 A | 9/2013 |
| KR | 200123820 Y1 | 8/1998 |
| KR | 0128517 Y1 | 11/1998 |
| KR | 0140800 Y1 | 4/1999 |
| KR | 1020140071326 A | 6/2014 |
| KR | 1020140133661 A | 11/2014 |

OTHER PUBLICATIONS

European Official Action (dated Oct. 9, 2018) for corresponoing European App. EP 15 88 4047.

[Fig. 1]
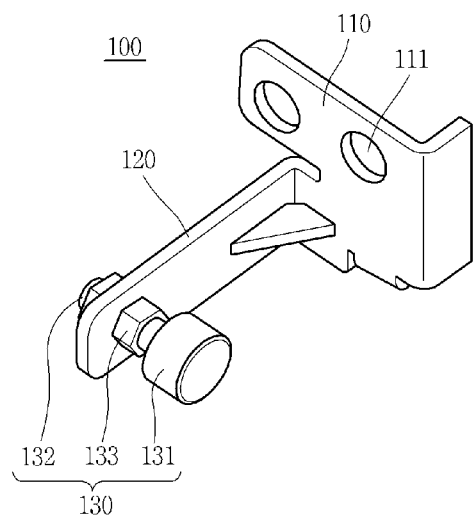
[Fig. 2]
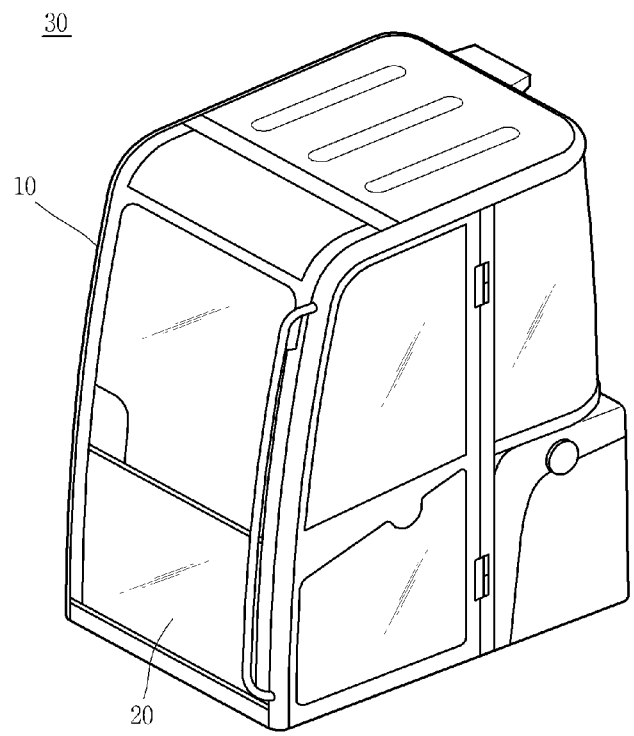

[Fig. 3]
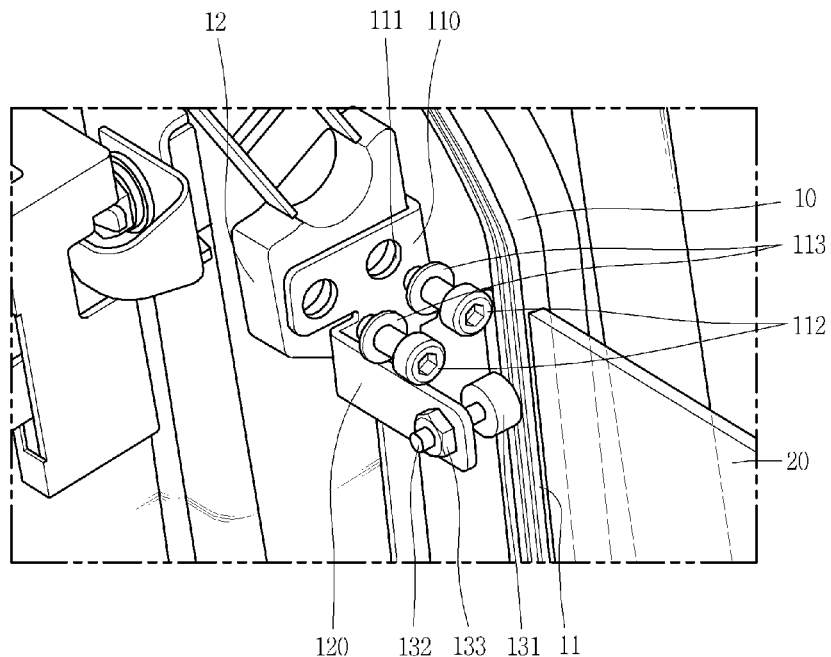
[Fig. 4]
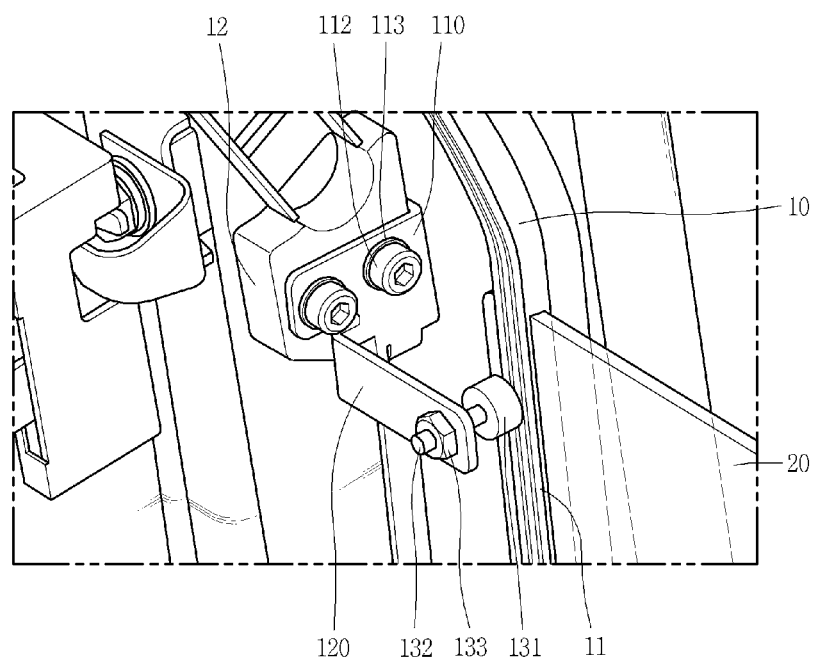

[Fig. 5]
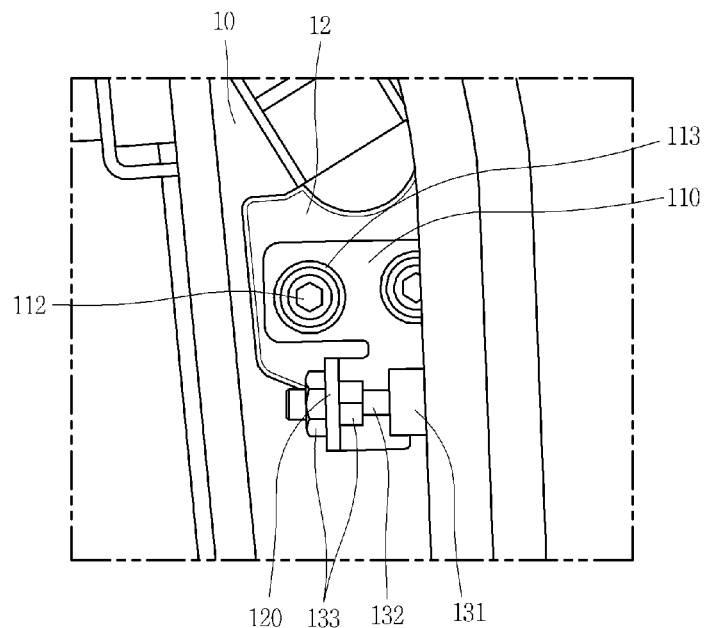
[Fig. 6]
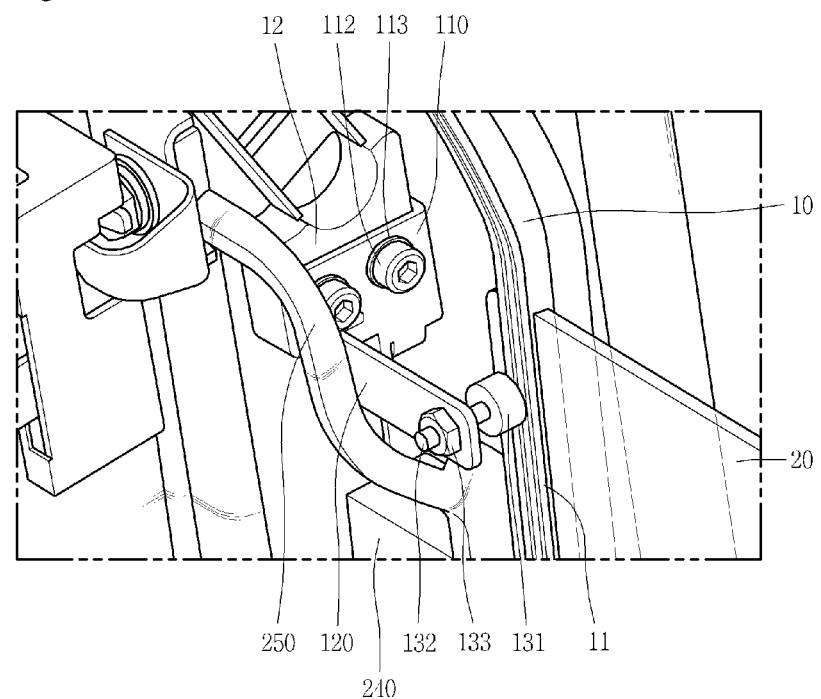

[Fig. 7]
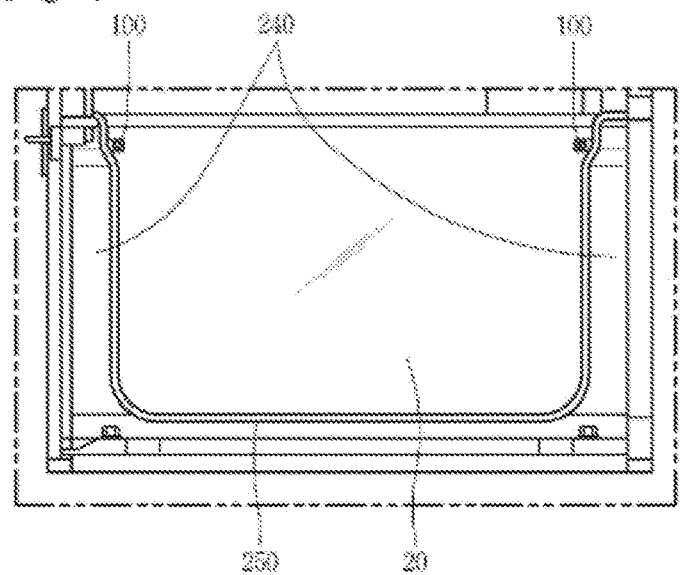
[Fig. 8] PRIOR ART
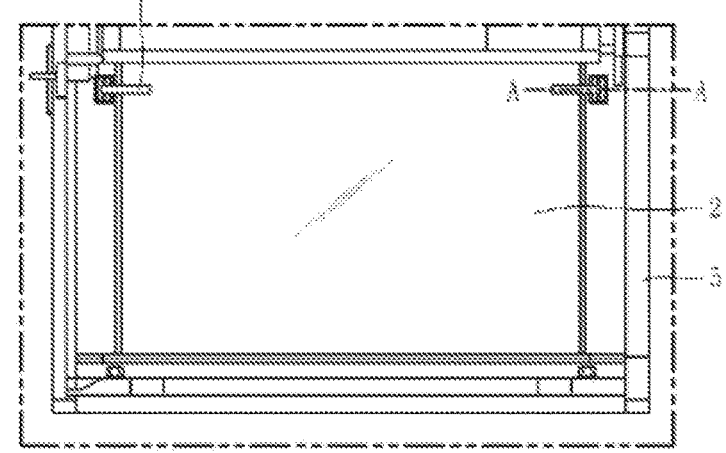
[Fig. 9] PRIOR ART
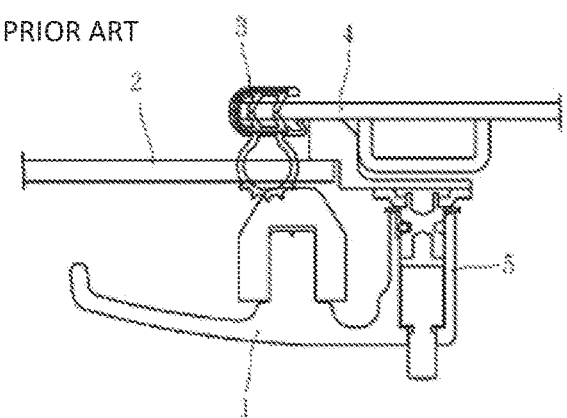

LEAK PREVENTION APPARATUS FOR OPERATOR CABIN OF CONSTRUCTION EQUIPMENT

BACKGROUND AND SUMMARY

The present disclosure relates to a leak prevention apparatus for construction equipment cabins. More particularly, the present disclosure relates to a leak prevention apparatus that can entirely prevent water from leaking into a cabin when a piece of construction equipment is being washed or when it is raining during operations of the piece of construction equipment.

In general, a lower windshield is detachably mounted on a lower frame of a cabin of a piece of construction equipment, such as an excavator, to protect an operator seated in the cabin from debris produced in operations and to ensure the operator's visibility. As illustrated in FIGS. 8 and 9, in the related art, the lower windshield 2 is mounted on the lower frame 5 of the cabin using handle-shaped fixing devices 1.

However, in the related art, the lower-windshield-fixing devices 1 press the lower windshield 2 with a fixed amount of force, i.e. the lower-windshield-fixing devices 1 can bring the lower windshield 2 into close contact with a weather strip 3 by only applying a fixed amount of force or pressure. Thus, the amounts of pressing force may be different, depending on positions due to welding tolerances or component tolerances, so that the lower-windshield-fixing devices 1 may be easily deformed. When the handle-shaped lower-windshield-fixing devices 1 are deformed, gaps between the lower windshield 2 and the front weather strip 3 and between the lower windshield 2 and a weather strip on the bottom edge of a front windshield may be excessively formed. Thus, water leakage by which water leaks into the cabin through the gaps, occurs frequently when construction equipment is being washed or when it is raining.

Accordingly, to provide a leak prevention apparatus for a cabin of construction equipment that can entirely prevent water from leaking into a cabin, even when a piece of construction equipment is being washed or when it is raining, during operations of the piece of construction equipment.

According to an aspect of the present disclosure, a leakage prevention apparatus for a cabin of construction equipment may include: a first plate configured to be coupled to a frame of a cabin of a piece of construction equipment; a second plate configured to extend from the first plate such as to face a lower windshield of the cabin; and a damper configured to press the lower windshield, the damper displaceably coupled to the second plate to adjust an amount of force pressing the lower windshield.

The first plate may be coupled to the frame by means of a screw.

Each of the frame and the first plate may have at least one screw hole, and the screw may be fastened to the at least one screw hole of the first plate and the at least one screw hole of the frame via a washer.

The damper may include: a head including one surface being able to come into contact with the lower windshield; a tail provided on the other surface of the head, including a thread around the tail, and being fitted through a coupling hole of the second plate; and nuts configured to be screwed to the tail in contact with one surface and the other surface of the second plate, respectively, to allow the tail to be displaceable in a direction of the lower windshield.

The head may be formed from a rubber material.

The lower windshield may be fitted into a hole of a lower windshield guide provided on the frame, and the damper may indirectly press the lower windshield via the lower windshield guide.

The leakage prevention apparatus may further include: block walls provided at distances from both sidewalls of the frame to face the both sidewalls, respectively, the both sidewalls guiding side portions of the lower windshield; and a weather strip arranged along peripheral portions of the lower windshield in contact with the lower windshield and connected to the block walls, thereby forming flow paths in a vertical direction between the block walls and the both sidewalls of the frame.

According to the present disclosure, it is possible to relieve mounting tolerances in association with a cabin frame using rubber dampers, displaceable to adjust the amount of force pressing a lower windshield, thereby preventing gaps from being formed between the cabin frame and the lower windshield when the lower windshield is mounted on the cabin frame. This can entirely prevent water from leaking into the cabin, even when a piece of construction equipment is being washed or when it is raining, during operations of the piece of construction equipment.

In addition, according to the present disclosure, block walls are provided at distances from both sidewalls of the cabin frame to face both sidewalls, respectively, the both sidewalls guiding side portions of the lower windshield, thereby forming flow paths between the block walls and the cabin frame. Even when water leaks into the cabin, the water can be properly drained by the flow paths instead of entering the cabin. Consequently, water can be prevented from entering the cabin.

BRIEF DESCRIPTION OF DRAWINGS

FIG. 1 illustrates a leakage prevention apparatus for a cabin of construction equipment according to an exemplary embodiment;

FIG. 2 illustrates a cabin of a piece of construction equipment in which the leakage prevention apparatus according to the exemplary embodiment is applied;

FIGS. 3 to 5 illustrate the leakage prevention apparatus according to the exemplary embodiment mounted in the cabin of the piece of construction equipment;

FIGS. 6 and 7 illustrate a leakage prevention apparatus according to another exemplary embodiment mounted in a cabin of a piece of construction equipment;

FIG. 8 illustrates a lower-windshield-fixing device of the related art, mounted for a lower windshield; and FIG. 9 is a cross-sectional view taken along line A-A in FIG. 8.

DETAILED DESCRIPTION

Hereinafter, a leakage prevention apparatus for a cabin of construction equipment, according to exemplary embodiments, will be described in detail with reference to the accompanying drawings.

In the following disclosure, detailed descriptions of known functions and components incorporated in the present disclosure will be omitted in the case that the subject matter of the present disclosure may be rendered unclear by the inclusion thereof.

As illustrated in FIGS. 1 to 5, a leakage prevention apparatus for a cabin of a piece of construction equipment (hereinafter referred to as the "leakage prevention apparatus") 100, according to an exemplary embodiment, is an apparatus for preventing water from leaking into a cabin 30 of the piece of construction equipment through a gap formed between a cabin frame 10 and a lower windshield 20, the lower windshield 20 being detachably mounted on the cabin frame 10. The leakage prevention apparatus 100 according to the exemplary embodiment is an apparatus for preventing such a gap from being formed or physically removing such a gap. In this regard, a plurality of leakage prevention apparatuses 100 may be disposed on edge portions of the lower windshield 20.

The leakage prevention apparatus 100 according to the exemplary embodiment includes a first plate 110, a second plate 120, and a damper 130.

The first plate 110 is fixed to the lower cabin frame 10 of the cabin 30 in which an operator sits to operate the piece of construction equipment, such as an excavator. The first plate 110 may be fixed to, for example, a roller support 12 of the cabin frame 10. The roller support 12 is a member for guiding the bottom of a windshield mounted in a front of the cabin 30.

The first plate 110 is in the shape of a plate, and can be brought into close contact with a surface portion of the cabin frame 10 and/or a roller support 12 of the cabin frame 10 and be mounted thereon using screws. In this regard, according to an embodiment, one or more connected screw holes 111 are formed in the roller support 12 and the first plate 110, i.e. each of the connected screw holes 111 is formed by aligning a screw hole formed in the first plate 110 with a screw hole formed in the roller support 12, and screws 112 are fastened to the connected screw holes 111, respectively. Washers 113 are provided so that the screws 112 can be more securely fastened.

The second plate 120 extends from the first plate 110 with an angle formed between the second plate 120 and the first plate 110 such that the second plate 120 faces the lower windshield 20. The second plate 120 may be formed integrally with the first plate 110. The second plate 120 extends from the first plate 110 to form a structure spaced apart from the lower windshield 20 by a predetermined distance. The distance between the second plate 120 and the lower windshield 20 may be adjusted in consideration of a range of movement of the displaceable damper 130 disposed between the second plate 120 and the lower windshield 20.

The second plate 120 is a member supporting the damper 130 coupled thereto. The second plate 120 has a coupling hole (not shown) for the coupling of the damper 130.

The damper 130 is coupled to the second plate 120, and more particularly, is coupled into the mounting hole (not shown) of the second plate 120. The damper 130 is located in a space defined between the second plate 120 and the lower windshield 20. The damper 130 is configured to be displaceable in the direction of the lower windshield 20 such that the amount of force or pressure against the lower windshield 20, is adjustable.

In this regard, the damper 130 according to the exemplary embodiment includes a head 131, a tail 132, and nuts 133.

One surface of the head 131 can be brought into face contact with the lower windshield 20. As illustrated in the drawings, the head 131 may be cylindrically shaped, such that the one surface thereof can be brought into face contact with the lower windshield 20 while the tail 132 is connected to the other surface thereof. The head 131 is a portion of the leakage prevention apparatus 100 that substantially presses the lower windshield 20. To prevent the lower windshield 20 from being broken when the head 131 is brought into contact with the lower windshield 20, the head 131 may be formed from a rubber material.

The tail 132 is provided on the other surface of the head 131. The tail 132 may be cylindrically shaped, with the longitudinal direction thereof being oriented to be normal to the lower windshield 20. The tail 132 is fitted into the coupling hole of the second plate 120. The tail 132 has a thread therearound, allowing the nuts 133 to be screwed thereto.

The nuts 133 are screwed to the tail 132. As illustrated in the drawings, when the tail 132 is fitted into the coupling hole (not shown) of the second plate 120, the nuts 133 are screwed to the tail 132 in tight contact with one and the other surfaces of the second plate 120, thereby fixing the tail 132 and the head 131 connected to the tail 132 to the second plate 120.

As described above, the thread is formed around the tail 132 of the damper 130 fitted into the coupling hole (not shown). When the tail 132 is fitted into the coupling hole (not shown) of the second plate 120, the nuts 133 are screwed around the tail 132, so that the damper 130 can be easily and securely fixed to the second plate 120. When the tail 132 is fitted into the coupling hole (not shown) of the second plate 120, it is possible to fix a position and state of the tail using the nuts 133, regardless of a distance by which the tail 132 is displaced through the coupling hole (not shown). That is, the nuts 133 allow the tail 132 fixed to the second plate 120 to be displaceable in the direction of the lower windshield 20. This consequently allows the head 131 to be displaced, so that the amount of force against the lower windshield 20 can be adjusted by displacing the head 131.

For example, when the lower windshield 20 is mounted on the cabin frame 10, different sized gaps may be formed between the mounting portions of the lower windshield 20 and the cabin frame 10, due to mounting tolerances. When a plurality of dampers 130, with the amount of force thereof against the lower windshield 20 being adjustable, are used, it is possible to adjust the amount of force against the lower windshield 20 depending on positions, thereby properly removing such gaps.

According to an embodiment, the lower windshield 20 may be fitted into a hole of a lower windshield guide 11 formed on the cabin frame 10, such that the damper 130 can be brought into contact with the lower windshield guide 11, thereby indirectly pressing the lower windshield 20 via the lower windshield guide 11. However, this is only illustrative, and the damper 130 may be brought into direct contact with the lower windshield 20 mounted on the cabin frame 10 to directly press the lower windshield 20, thereby fixing the lower windshield 20 to the cabin frame 10.

As described above, the leakage prevention apparatus 100 according to the exemplary embodiment includes: the damper 130 being displaceable to adjust the amount of force against the lower windshield 20; the second plate 120 coupled to and fixing the damper 130; and the first plate 110 connected to the second plate 120 to fix the second plate to the cabin frame 10.

As described above, the leakage prevention apparatus 100 according to the exemplary embodiment can relieve mounting tolerances in association with the cabin frame 10, thereby preventing gaps from being formed between the cabin frame 10 and the lower windshield 20 when the lower windshield 20 is mounted on the cabin frame 10. This can entirely prevent water from leaking into the cabin 30 even when construction equipment is being washed or when it is raining during operations of the piece of construction equipment.

Hereinafter, a leakage prevention apparatus according to another exemplary embodiment will be described with reference to FIGS. 6 and 7.

FIGS. 6 and 7 illustrate the leakage prevention apparatus according to another exemplary embodiment mounted in a cabin of a piece of construction equipment.

As illustrated in FIGS. 6 and 7, the leakage prevention apparatus according to another exemplary embodiment includes the first plates 110, the second plates 120, the dampers 130, block walls 240, and a weather strip 250.

Another exemplary embodiment is substantially the same as the foregoing exemplary embodiment, except that the block walls and the weather strip are further provided. The same components will be denoted by the same reference numerals and detailed descriptions thereof will be omitted.

The block walls 240 are disposed at distances from both sidewalls of the cabin frame 10 to face the both sidewalls, respectively. The both sidewalls of the cabin frame 10 guide side portions of the lower windshield 20. In addition, the weather strip 250 is arranged along peripheral portions of the lower windshield 20 in contact with the lower windshield 20. The weather strip 250 is connected to the block walls 240, thereby forming flow paths (not shown) in a vertical direction between the block walls 240 and the both sidewalls of the cabin frame 10.

As described above, the vertical flow paths (not shown) are formed by the assembly structure including the block walls 240, the weather strip 250, and the cabin frame 10. Even when water leaks into the cabin 30, the water can be properly drained by the flow paths (not shown) instead of entering the cabin 30. Consequently, water can be prevented from entering the cabin 30.

The foregoing descriptions of specific exemplary embodiments of the present disclosure have been presented with respect to the drawings and are not intended to be exhaustive or to limit the present disclosure to the precise forms disclosed, and obviously many modifications and variations are possible for a person having ordinary skill in the art in light of the above teachings.

It is intended therefore that the scope of the present disclosure not be limited to the foregoing embodiments, but be defined by the Claims appended hereto and their equivalents.

The invention claimed is:

1. A leakage prevention apparatus for a cabin of construction equipment, comprising:
   a first plate configured to be coupled to a frame of a cabin of a piece of construction equipment;
   a second plate configured to extend from the first plate such as to face a lower windshield of the cabin;
   a damper configured to press the lower windshield, the damper displaceably coupled to the second plate to adjust an amount of force pressing the lower windshield;
   block walls provided at distances from both sidewalls of the frame to face the both sidewalls, respectively, the both sidewalls guiding side portions of the lower windshield; and
   a weather strip arranged along peripheral portions of the lower windshield in contact with the lower windshield and connected to the block walls, thereby forming flow paths in a vertical direction between the block walls and the both sidewalls of the frame.

* * * * *